(12) United States Patent
Breidenstein et al.

(10) Patent No.: US 10,995,685 B2
(45) Date of Patent: May 4, 2021

(54) TRI-FUEL ELECTRIC POWER GENERATOR

(71) Applicants: GAS TECHNOLOGIES LLC, Walloon Lake, MI (US); FUEL INJECTION TECHNOLOGIES CO., LTD., Riverside, CA (US)

(72) Inventors: Walter Breidenstein, Boyne Falls, MI (US); Harold Sun, West Bloomfield, MI (US); Yi Wang, Dong Guan (CN); Zengyu Shan, Farmington Hills, MI (US)

(73) Assignees: GAS TECHNOLOGIES LLC, Walloon Lake, MI (US); FUEL INJECTION TECHNOLOGIES CO., LTD., Riverside, CA (US)

( * ) Notice: Subject to any disclaimer, the term of this patent is extended or adjusted under 35 U.S.C. 154(b) by 0 days.

(21) Appl. No.: 16/414,322

(22) Filed: May 16, 2019

(65) Prior Publication Data
US 2019/0353111 A1 Nov. 21, 2019

Related U.S. Application Data

(60) Provisional application No. 62/672,360, filed on May 16, 2018.

(51) Int. Cl.
*F02B 13/00* (2006.01)
*F02D 41/00* (2006.01)
*F02B 63/04* (2006.01)

(52) U.S. Cl.
CPC .......... *F02D 41/0025* (2013.01); *F02B 63/04* (2013.01)

(58) Field of Classification Search
CPC ............. F02D 41/0025; F02D 19/0647; F02D 19/0613; F02D 19/0615; F02B 63/04; F02B 69/04
USPC ....................................................... 123/575
See application file for complete search history.

(56) References Cited

U.S. PATENT DOCUMENTS

| 9,180,426 | B2 | 11/2015 | Pawlak et al. | |
| 10,393,034 | B2 * | 8/2019 | Collie | F02M 19/08 |
| 10,697,379 | B2 * | 6/2020 | Collie | F02B 63/04 |
| 2013/0168969 | A1 * | 7/2013 | Markoski | F01N 13/08 |
| | | | | 290/1 A |

(Continued)

*Primary Examiner* — Long T Tran
*Assistant Examiner* — James J Kim
(74) *Attorney, Agent, or Firm* — Brooks Kushman P.C.

(57) ABSTRACT

An electricity generator includes a generator section which is a complete standalone electricity generator designed to operate on a hydrocarbon fuel and a fuel conversion section which adapts the generator section to operate on alternative fuels that are different than the designed fuel of generator section. The generator section includes a RPM control unit, an internal combustion engine which has a crankshaft, an electromagnetic conversion component which converts the rotational motion of the crankshaft into electricity and a crankshaft sensor which senses the rotational speed of the crankshaft thereby creating a RPM control signal. The control signal is provided to the RPM control unit which controls the rotational speed of the crankshaft. The fuel conversion section includes a first fuel source and a second fuel source. Characteristically, the first fuel source provides a methanol-containing fuel and the second fuel source provides LPG or flare gas.

17 Claims, 2 Drawing Sheets

(56) References Cited

U.S. PATENT DOCUMENTS

2015/0122230 A1* 5/2015 Sarder ................. F02D 19/0613
　　　　　　　　　　　　　　　　　　　　　　　　123/525
2016/0363058 A1* 12/2016 Sarder ................. F02D 19/0605

* cited by examiner

TRI-FUEL ELECTRIC POWER GENERATOR

CROSS-REFERENCE TO RELATED APPLICATIONS

This application claims the benefit of U.S. provisional application Ser. No. 62/672,360 filed May 16, 2018, the disclosure of which is hereby incorporated in its entirety by reference herein.

TECHNICAL FIELD

In at least one aspect, the present invention relates to systems and methods for generating electricity from propane, flare gas, and/or methanol.

BACKGROUND

Electrical generators used in remote areas like the oil fields often need to deal with various fuels, due to the constraint of infrastructure, such as natural gas, propane, and the like. Flare gas is the flammable exhaust gases of many industrial process such as petroleum refineries, chemical plants, natural gas processing plants, and oil wells. A new technology developed by Gas Technologies LLC and FiTech Fuel can recover the fare gas that would otherwise be vented to the ambient, causing for ocean concerns, and convert the fare gas into methanol. Although this technology works well, new cost effective systems for using the recovered methanol are desirable.

Accordingly, there is a need for improved methods and systems for using methanol and other combustible liquids recovered from flare gas.

SUMMARY

In at least one aspect, the present invention provides a new technology that can either directly consume the flare gas to generate electricity, when the sulfur contents in the fare gas are tolerable by the local emission regulations, or convert the fare gas into methanol that can be used to generate electricity to meet more stringent emission regulations. When necessary, the generator sets can still use natural gas or propane. The oxygen sensor based close loop control system can automatically adjust the methanol fuel injection in the intake manifold based on the remaining oxygen that is detected in the exhaust. The fuels can be switched manually or automatically based on fuel availability in the tank.

In another aspect, an electricity generator includes a generator section which is a complete standalone electricity generator designed to operate on a hydrocarbon fuel and a fuel conversion section which adapts the generator section to operate on alternative fuels that are different than the designed fuel of generator section. The generator section includes a RPM control unit, an internal combustion engine which has a crankshaft, an electromagnetic conversion component which converts the rotational motion of the crankshaft into electricity and a crankshaft sensor which senses the rotational speed of the crankshaft thereby creating a RPM control signal. The control signal is provided to the RPM control unit which controls the rotational speed of the crankshaft. The fuel conversion section includes a first fuel source and a second fuel source. Characteristically, the first fuel source provides a methanol-containing fuel and the second fuel source provides LPG or flare gas.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1:
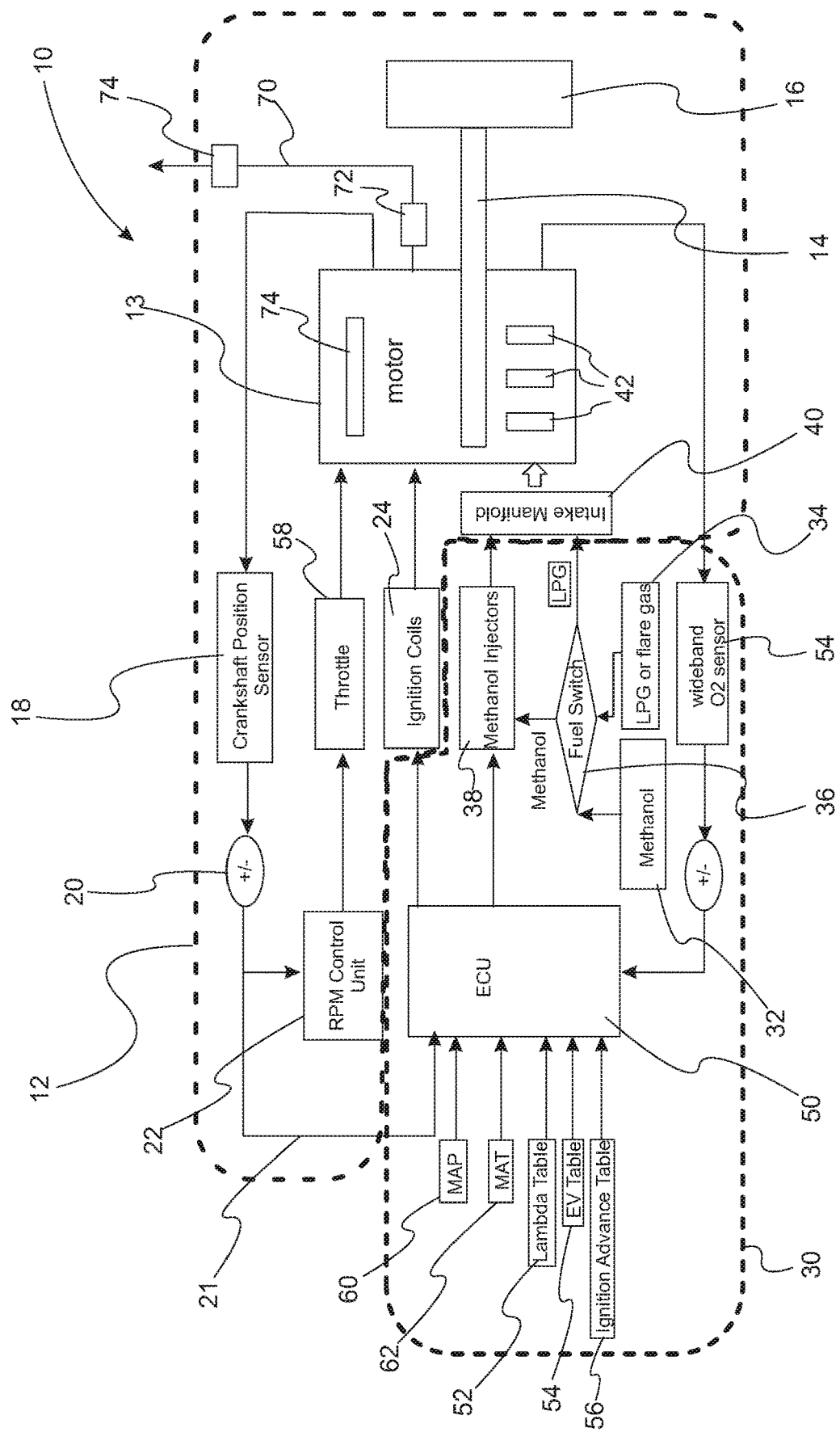
FIG. 1 is a schematic illustration of an electric generator that runs on three different fuels: propane, flare gas, and/or methanol.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100.

Throughout this application, where publications are referenced, the disclosures of these publications in their entireties are hereby incorporated by reference into this application to more fully describe the state of the art to which this invention pertains.

ABBREVIATIONS

"BSCO" means brake specific CO.
"BSNOx" means brake specific NOx.
"ECU" means engine control unit.
"MAP" means manifold air pressure.
"MAT" means manifold air temperature.
"NOx" means oxides of nitrogen.
"RPM" means rotations per minute, i.e., the engine speed.
"LPG" means liquefied petroleum gas.
"LNT" means lean NOx trap.
"SCR" means selective catalytic reduction.

Definitions

"Lambda table" means the air fuel ratio table.

"NOx" means oxides of nitrogen that are relevant to air pollution. Typically, NOx is a mixture of NO and $NO_2$. Therefore, x is a number from 1 to 2. In a refinement, x is from 1.2 to 1.8.

In an embodiment, a generator for producing electricity is provided. FIG. 1 provides a schematic of such a generator that is formed by retrofitting a generator that was designed to operate with natural gas as fuel. Electricity generator 10 includes a generator section 12 which is a complete stand-alone electricity generator designed to operate on a hydrocarbon fuel such as methane, propane, and the like. Generator section 12 includes internal combustion engine 13 which includes crankshaft 14 and electromagnetic conversion component 16 which converts the rotational motion of the crankshaft into electricity. Conversion component 16 can be of the dynamo or alternator design. Generator 10 also includes crankshaft sensor 18 which senses the rotational speed and/or the position of the crankshaft thereby creating RPM control signal 20. The control signal is provided to RPM control unit 22 which controls the rotational speed of the crankshaft. In a refinement, generator section 12 is of a conventional electromagnetic type which converts the input mechanical energy from rotation of crankshaft 14 into a generally alternating (e.g. sinusoidal) electric current or voltage. Generator section 12 also includes one or more ignition coils 24 which are an induction coil that elevates electric voltage high enough to ignite natural gas, propane or methanol, or their mixture. Ignition coils 24 are typically integrated with a spark plug for each engine cylinder.

Characteristically, electricity generator 10 includes fuel conversion section 30 which adapts generator section 12 to operate on alternative fuels that are different than the designed fuel of generator section 12. Fuel conversion section 30 includes first fuel source 32 and second fuel source 34. In a refinement, first fuel source 32 provides a methanol-containing fuel (e.g., methanol) while second fuel source 34 provides LPG or flare gas. U.S. Pat. No. 9,180,426 provides a method and system for producing methanol that can be integrated into the present embodiment; the entire disclosure of this application is hereby incorporated by reference. Fuel selector switch 36 is used to provide a fuel to be used for operation of internal combustion engine 13. If methanol is selected, the methanol is fed to fuel injectors 38 and then to manifold 40. If LPG or flare gas is selected, the fuel is provided directly to manifold 40. Alternatively, the methanol can be injected directly into the engine cylinders 42.

Fuel conversion section 30 is under the control of engine control unit (ECU) 50 which receives RPM control signal 20 which sends an ignition control signal to ignition coils 24. ECU 50 receives signals for the manifold air, manifold air temperature as well as accessing the lambda table 52, EV table 54, and ignition advance table 56, all of which are used for engine control. In a refinement, the engine control unit or the RPM control unit 22 continues to control the engine speed via throttle 58. Spark ignition timing is managed by retrofit ECU 50, based on crank position signal 20 from generator section 12. The spark advance table, lambda table, as functions of MAP 60, MAT 62, and engine speeds, load, will be calibrated and then saved in ECU 50.

Fuel conversion section 30 also includes oxygen sensor 54. Since different fuels have different stoichiometric air fuel ratios, the oxygen remaining in the exhaust will be detected by the oxygen sensor 54 and calculated to make changes in engine management accordingly.

Motor exhaust 70 is also depicted in FIG. 1. In some variations, generator 10 can include catalytic converters 72 in exhaust 70 and an intake air grid heater 74. Catalytic converters are required to meet stringent emission regulations when applicable. Other emission control technologies, such as exhaust gas recirculation (EGR), ammonium injection/Selective catalytic reduction (SCR), or lean NOx trap (LNT) (generally represented by item number 74) which all will be controlled by the retrofit ECU 50 can be adapted to further control tailpipe emissions.

Figure 2:
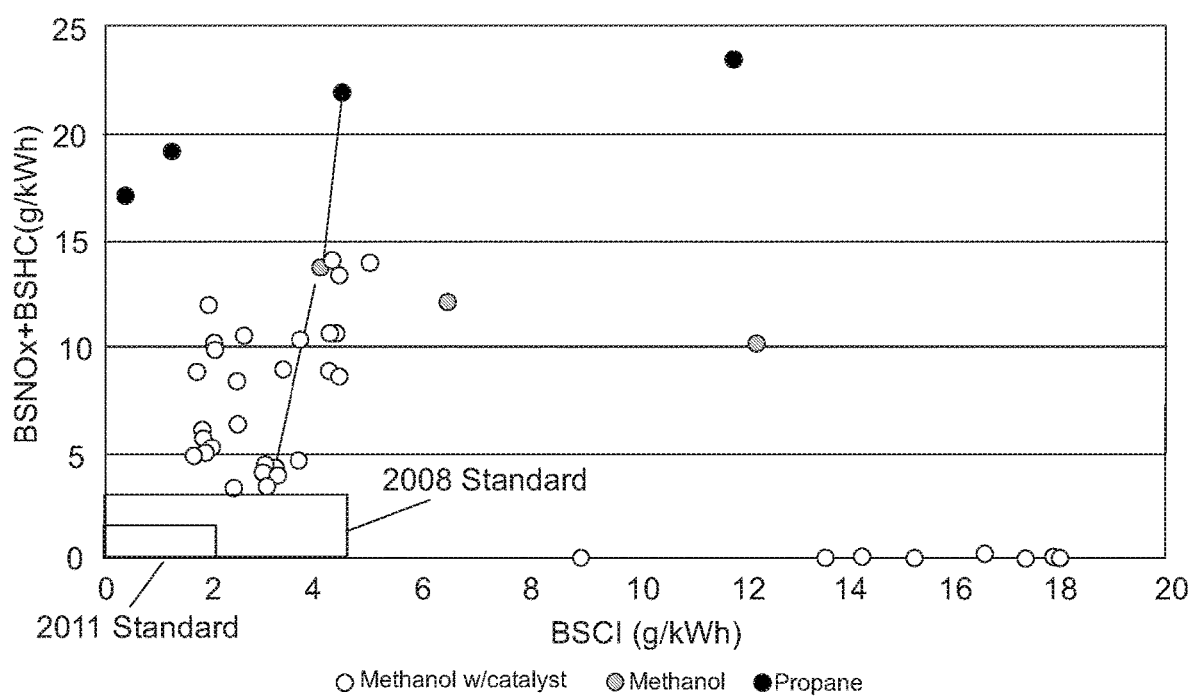
FIG. 2 provides a plot of BSNOx versus BSCO for test demonstrations

FIG. 2 provides a plot of BSNOx versus BSCO for test demonstrations that were conducted on a 2001MY natural gas generator set (that had no emission requirements at the time of production for stationary power generation). The result shows that switching fuel from propane to methanol can effectively reduce NOx emissions primarily due to lower frame temperature in the cylinder; adding a production three-way catalyst further reducing emissions near the level that is required for 2008 emission standards despite the fact the 17 year old, non-emissionized engine is well beyond its) warranty period (typically five years). Therefore, it is clear that a retrofit of a newer LPG engine for using methanol can reduce the tailpipe emission to meet future emission regulations within its warranty period.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electricity generator comprising:
   a generator section which is a complete standalone electricity generator designed to operate on a hydrocarbon fuel, the generator section including:
   a rotations per minute (RPM) control unit;
   an internal combustion engine which has a crankshaft;
   an electromagnetic conversion component which converts rotational motion of the crankshaft into electricity; and
   a crankshaft sensor which senses rotational speed of the crankshaft thereby creating an RPM control signal, the RPM control signal being provided to the RPM control unit which controls the rotational speed of the crankshaft; and
   a fuel conversion section which adapts the generator section to operate on alternative fuels that are different than a designed fuel of the generator section, the fuel conversion section including a first fuel source and a second fuel source, the first fuel source providing a methanol-containing fuel and the second fuel source providing liquefied petroleum gas (LPG) providing or flare gas.

2. The electricity generator of claim 1 wherein the hydrocarbon fuel is methane or propane.

3. The electricity generator of claim 1 wherein generator section is of a conventional electromagnetic type which converts the input mechanical energy from rotation of crankshaft into a generally sinusoidal electric current or voltage.

4. The electricity generator of claim 1 wherein the electromagnetic conversion component is of a dynamo or alternator design.

5. The electricity generator of claim 1 further comprising a fuel selector switch to select a fuel for operation of internal combustion engine.

6. The electricity generator of claim 5 wherein the generator section includes a manifold and the fuel conversion section includes one or more fuel injectors.

7. The electricity generator of claim 6 wherein if methanol is selected, the methanol is fed to the fuel injectors and then to the manifold.

8. The electricity generator of claim 6 wherein if methanol is selected, the methanol is directly injected into engine cylinders.

9. The electricity generator of claim 6 wherein if LPG or flare gas is selected, the fuel is provided directly to the manifold.

10. The electricity generator of claim 6 wherein the fuel conversion section further includes an engine control unit which receives the RPM control signal from the generator section while sending an ignition control signal to ignition coils.

11. The electricity generator of claim 10 wherein the engine control unit receives signals for manifold air, manifold air temperature as well as accessing a lambda table, EV table, and ignition advance table all of which are used for engine control.

12. The electricity generator of claim 10 wherein the engine control unit controls engine speed via throttle.

13. The electricity generator of claim 10 wherein spark ignition timing is managed by the engine control unit based on crank position signal from generator section.

14. The electricity generator of claim 10 wherein a spark advance table, a lambda table, which are functions of manifold air pressure (MAP), manifold air temperature (MAT), engine speeds, and load, are calibrated and then saved in the engine control unit.

15. The electricity generator of claim 10 wherein the fuel conversion section further includes at least an oxygen sensor.

16. The electricity generator of claim 15 wherein remaining oxygen in an exhaust is detected by the oxygen sensor resulting in changes in engine management since different fuels have different stoichiometric air fuel ratios.

17. The electricity generator of claim 10 further comprising a catalytic converter.

* * * * *

UNITED STATES PATENT AND TRADEMARK OFFICE
CERTIFICATE OF CORRECTION

PATENT NO. : 10,995,685 B2
APPLICATION NO. : 16/414322
DATED : May 4, 2021
INVENTOR(S) : Walter Breidenstein et al.

Page 1 of 1

It is certified that error appears in the above-identified patent and that said Letters Patent is hereby corrected as shown below:

In the Claims

Column 5, Line 34, Claim 1:
After "providing liquefied petroleum gas (LPG)"
Delete "providing".

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*